(12) United States Patent
Green et al.

(10) Patent No.: US 7,454,440 B2
(45) Date of Patent: Nov. 18, 2008

(54) ENHANCING RESOURCE ADAPTERS

(75) Inventors: John H. Green, Toronto (CA); David R H Kelsey, Hants (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/496,722

(22) PCT Filed: Oct. 30, 2002

(86) PCT No.: PCT/GB02/04897

§ 371 (c)(1),
(2), (4) Date: Nov. 8, 2004

(87) PCT Pub. No.: WO03/046722

PCT Pub. Date: Jun. 5, 2003

(65) Prior Publication Data

US 2005/0065800 A1 Mar. 24, 2005

(30) Foreign Application Priority Data

Nov. 21, 2001 (CA) .................................. 2363515

(51) Int. Cl.
*G06F 17/30* (2006.01)
*G06F 9/45* (2006.01)

(52) U.S. Cl. .................. 707/104.1; 707/10; 707/103 X; 709/203; 717/108; 717/136

(58) Field of Classification Search ................. 707/100, 707/104.1, 103 R–103 Z, 4, 10; 709/203; 717/100, 106, 108, 136; 715/205, 234, 760, 715/762, 763
See application file for complete search history.

(56) References Cited

U.S. PATENT DOCUMENTS

| 6,064,382 | A | 5/2000 | Diedrich et al. |
| 6,421,681 | B1 | 7/2002 | Gartner et al. |
| 6,718,334 | B1 * | 4/2004 | Han .......................... 707/102 |

(Continued)

FOREIGN PATENT DOCUMENTS

JP 10-083307 3/1998

(Continued)

*Primary Examiner*—Cheryl Lewis
(74) *Attorney, Agent, or Firm*—Joseph P. Abate

(57) ABSTRACT

The present invention is directed generally to client-server, client-host, or server-server communications in a distributed computer network and, more particularly, to enhancing of resource adapters adapted to facilitate such communications. The present invention is directed to enhancing resource adapters that work with screens. Aspects of the invention, which may be incorporated into or communicate with existing resource adapters, provide a standard screen record for manipulating data on a screen image. The standard screen record provides support for instances where prior knowledge of the screen format or layout is known and for those instances where there is no knowledge of the screen format. Additionally, the standard screen record provides detailed data describing all attributes of a field and of the screen image itself. Additionally, the invention also provides easy access to the field attribute data. In some embodiments, aspects of the invention may include interfaces which enable tooling to be developed which can then be used to develop applications which utilize the functionality of the other aspects of the invention. This interface could provide a common way for tooling to support resource adapters that implemented the interface.

2 Claims, 4 Drawing Sheets

U.S. PATENT DOCUMENTS

| | | | |
|---|---|---|---|
| 7,007,278 B2 * | 2/2006 | Gungabeesoon | 719/311 |
| 7,111,229 B2 * | 9/2006 | Nicholas et al. | 715/511 |
| 7,124,357 B1 * | 10/2006 | Orr | 715/513 |
| 7,171,414 B1 * | 1/2007 | Nazem et al. | 707/10 |
| 2003/0061569 A1 * | 3/2003 | Aoki | 715/517 |
| 2004/0044678 A1 | 3/2004 | Kalia et al. | |
| 2006/0136843 A1 * | 6/2006 | Shafron | 715/826 |

FOREIGN PATENT DOCUMENTS

| | | |
|---|---|---|
| JP | 10-214196 | 8/1998 |
| JP | 2001-043076 | 2/2001 |

* cited by examiner

ENHANCING RESOURCE ADAPTERS

FIELD OF THE INVENTION

The invention relates generally to client-server, client-host, or server-server communications in a distributed computer network and, more particularly, to enhancing of resource adapters adapted to facilitate such communications.

SEQUENCE LISTING

Program code as listed on Compact Disc # 10/496,722, which is Incorporated herein.

BACKGROUND OF THE INVENTION

There exist many legacy server applications that have provided and continue to provide valuable information processing servers to organizations worldwide. Many of these legacy server applications, which are the result of many years of development, contain, store or access many years (and sometimes decades) worth of data. These legacy applications are now being forced to become part of distributed applications (that is, applications which use the services and facilities of many servers and clients). For example, in a typical electronic transaction being performed on a client system (e.g., a personal computer, personal digital assistant, etc.) an individual may, unknowingly, initiate a transaction that involves: an application server (which typically provides the data or business logic processing necessary to deliver up-to-date information; additionally and typically an application server sits along with or between the user and the databases and legacy applications and provides the middleware glue to enable a browser-based application to link to multiple sources of information; with Java-based application servers the processing is performed by Java servlets, JavaServer Page and Enterprise JavaBeans) and other back end systems such as databases or legacy applications.

Many legacy systems deliver to clients a text-based screen which provides a client/user with information and allows a user to input data, modify data or submit a transaction for processing. For example, legacy applications deliver data which was originally designed to be displayed by an IBM 3270 terminal. In the example of the 3270 applications, a screen includes fields where data can be presented to a user or data entered into the field by the user. For example, a screen may contain two fields, one which is a prompt with the text "Name:", and the second field which contains a person's name or allows a person's name to be entered by a user. Each field besides containing text has attributes, which indicate the text color, background color (which may be associated with many color related attributes such as the color of text, the background color of text, etc.), whether the field is protected, whether the text has been modified, etc.

Two exemplary legacy applications that communicate with client systems are Customer Information Control System (CICS) 3270 applications (where CICS provides terminal routing, password security, transaction logging for error recovery and activity journals for performance analysis amongst other features) and Host 3270 applications.

Present client systems often employ a 3270 terminal emulation product (and the protocols) to render the data transmitted by the legacy application. The terminal emulation product allows a user to view 3270 screens on a personal computer, instead of using a 3270 terminal.

Alternatively, for these two exemplary legacy applications, a Java™ 2, Enterprise Edition (J2EE) Connector Architecture resource adapter (also sometimes referred to as a connector) can be hosted by an application server. The Host on Demand (HOD) and CICS Transaction Gateway products from IBM provide such resource adapters. These resource adapters receive a data stream from a legacy 3270 application and they each provide a product specific programming interface that allows an application to work with the fields of a screen. With today's more powerful graphical user interfaces, the application can display the data in a more meaningful way, such as combining the contents of several screens into a single Web Browser page.

The 3270 data stream is a highly optimized stream which describes a screen image. A resource adapter is at liberty to deliver the screen information in any format it desires. Current resource adapters (CICS and HOD, for example) send a stream which represent each byte on a X by Y screen, modifying invisible screen bytes with extra information about the bytes that make up a field (i.e., foreground color, background color). This mechanism is highly inefficient, compared to a 3270 data stream, when providing full information about a screen image since it requires sending multiple X by Y streams with changes to the invisible bytes to obtain all the possible attribute information.

These resource adapters have other significant shortcomings. For example, these resource adapters currently require the data for the entire screen to be sent, where it could be optimized to only send the data of modified fields. Additionally, when developing applications to interact with the data stream provided by a resource adapter, prior knowledge of the screen image is necessary so that use of the fields and their location on the screen can be made. Unfortunately, having this prior knowledge of the screen image is not always available.

Further, specific tooling must be created to develop applications that use the facilities offered by a connector or resource adapter. As such, given the examples above, different tooling would have to be created for each of the J2EE resource adapters described above. This is inefficient.

Accordingly, providing an interface that resource adapters can implement to overcome, at least in part, some or all of the shortcomings described above would be desirable.

SUMMARY OF THE INVENTION

The present invention is directed generally to client-server, client-host, or server-server communications in a distributed computer network and, more particularly, to enhancing of resource adapters adapted to facilitate such communications. The present invention is directed to enhancing resource adapters that work with screens.

Aspects of the invention, which may be incorporated into or communicate with existing resource adapters, provide a standard screen record for manipulating data on a screen image. The standard screen record provides support for instances where prior knowledge of the screen format or layout is known and for those instances where there is no knowledge of the screen format. Additionally, the standard screen record provides detailed data describing all attributes of a field and of the screen image itself. Additionally, the invention also provides easy access to the field attribute data.

In some embodiments, aspects of the invention may include interfaces which enable tooling to be developed which can then be used to develop applications which utilize the functionality of the other aspects of the invention. This interface could provide a common way for tooling to support resource adapters that implemented the interface.

In one embodiment of the invention, for use in an object oriented environment, a screen is represented by a collection of objects—a screen object containing field objects. Additionally, a screenable interface describes a highly efficient way of presenting a screen image and a screen record is used to present the screen image to a client application.

In accordance with an aspect of the present invention there is provided a method for providing data describing a screen image to a first application, the method comprising: for data received from a second application, said received data describing a field, populating a data structure with said data describing said field, said data structure including a function for accessing said data describing said field.

In accordance with another aspect of the present invention there is provided a data structure for providing data describing a screen image to an application, the data structure comprising: storage for data describing a field of said screen image; and a function for accessing said data.

In accordance with still another aspect of the present invention there is provided computer readable media containing data and instructions, the data and instructions, when executed, adapt a computer system to: for data received from a second application, said received data describing a field, populate a data structure with said data describing said field, said data structure including a function for accessing said data describing said field.

Other aspects and features of the present invention will become apparent to those ordinarily skilled in the art upon review of the following description of specific embodiments of the invention in conjunction with the accompanying figures.

DETAILED DESCRIPTION

Figure 1:
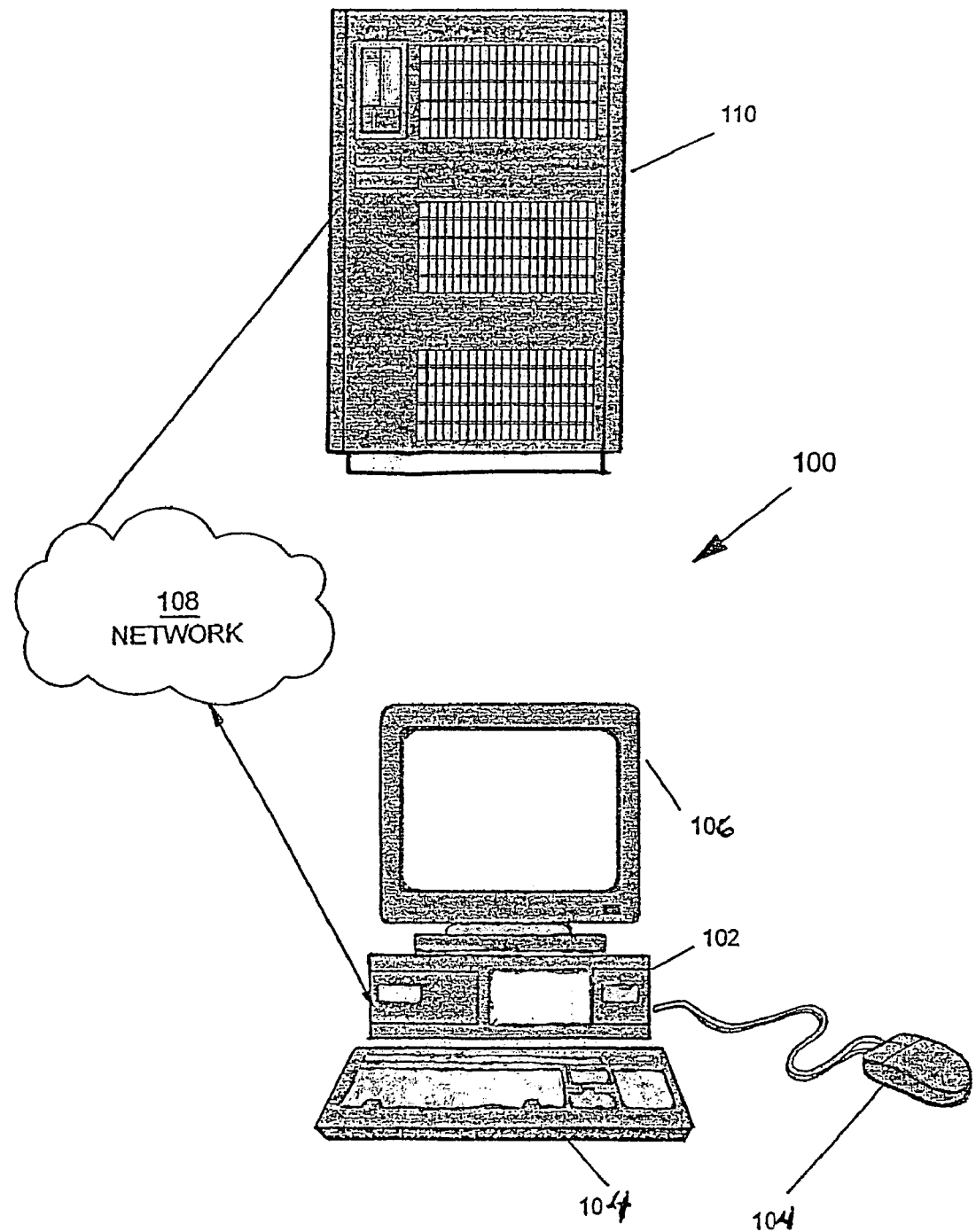
FIG. 1 schematically illustrates a computer system embodying aspects of the invention.

An embodiment of the invention, computer system 100, is illustrated in FIG. 1. Computer network 100, illustrated for exemplary purposes as including a general purpose, networked computing device 102, is in communication with other networked computing devices, such as host 110 via network 108. As will be appreciated by those of ordinary skill in the art, network 108 may be embodied using conventional networking technologies and may include one or more of the following: local area networks, wide area networks, intranets, public Internet and the like. Furthermore, network 108 may physically be embodied in any type of network be it electrical, optical, wireless or various hybrid combinations. Further, although computing device 102 is illustrated as a conventional desktop computer, other networked computing devices could be additionally and alternatively employed. Such networked computing devices may include a tablet portable computer, notebook computer, personal digital assistant or the like. Accordingly and hereinafter, computing device 102 will be referenced as client 102.

In the exemplary embodiments client 102 and host 110 each includes processing system 102 which communicates with various input devices 104, output devices 106 and network 108. Input devices 104, two of which are shown, may include, for example, a keyboard, a mouse, a scanner, an imaging system (e.g., a camera, etc.) or the like. Similarly, output devices 106 (only one of which is illustrated) may include displays, information display unit printers and the like. Additionally, combination input/output (I/O) devices may also be in communication with processing system 102. Examples of conventional I/O devices include removable and fixed recordable media (e.g., floppy disk drives, tape drives, CD-ROM drives, DVD-RW drives, etc.), touch screen displays and the like.

Figure 2:
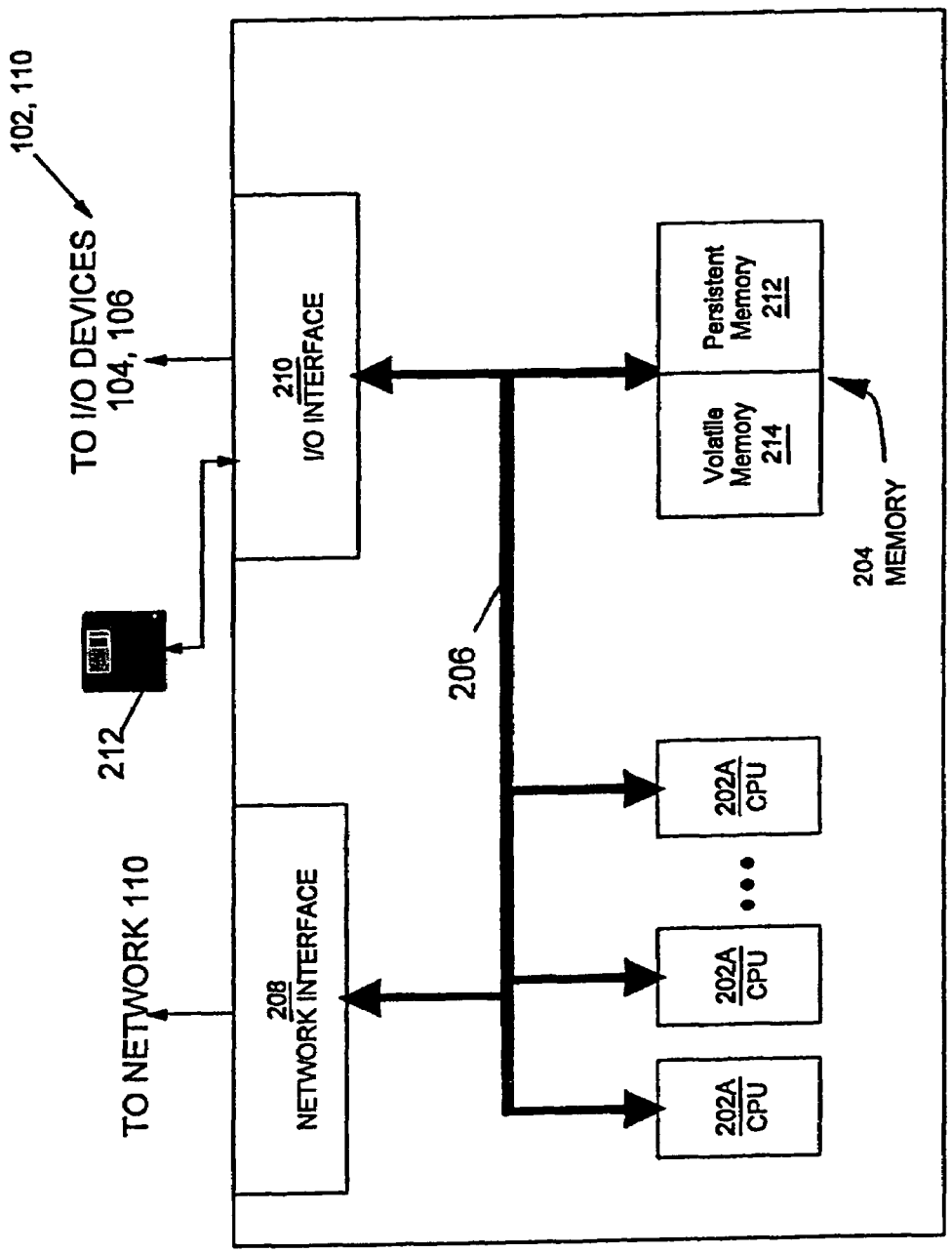
FIG. 2 schematically illustrates, in greater detail, a portion of the computer system of FIG. 1.

An example of client 102 and host 110 is illustrated in greater detail in FIG. 2. As illustrated, client 102 or host 110 each include several components—central processing unit (CPU) 202, memory 204, network interface (I/F) 208 and I/O I/F 210. Each component is in communication with the other components via a suitable communications bus 206 as required.

CPU 202 is a processing unit, such as an Intel Pentium™, IBM PowerPC™, Sun Microsystems UltraSparc™ processor or the like, suitable for the operations described herein. As will be appreciated by those of ordinary skill in the art, other embodiments of processing system 102 could use alternative CPUs and may include embodiments in which one or more CPUs are employed. CPU 202 may include various support circuits to enable communication between itself and the other components of client 102 or host 110, respectively.

Memory 204 includes both volatile and persistent memory for the storage of: operational instructions for execution by CPU 202, data registers, application storage and the like. Memory 204 preferably includes a combination of random access memory (RAM), read only memory (ROM) and persistent memory such as that provided by a hard disk drive.

Network I/F 208 enables communication between client 102 (or host 110) and other network computing devices (not shown) via network 108. Network I/F 208 may be embodied in one or more conventional communication devices. Examples of a conventional communication device include an Ethernet card, a token ring card, a modem or the like. Network I/F 208 may also enable the retrieval or transmission of instructions for execution by CPU 202 from or to a remote storage media or device via network 108.

I/O I/F 210 enables communication between processing system 102 and the various I/O devices 104, 106. I/O I/F 210 may include, for example, a video card for interfacing with an external display such as output device 106. Additionally, I/O I/F 210 may enable communication between processing system 102 and a removable media 212. Although removable media 212 is illustrated as a conventional diskette other removable memory devices such as Zip™ drives, flash cards, CD-ROMs, static memory devices and the like may also be employed. Removable media 212 may be used to provide instructions for execution by CPU 202 or as a removable data storage device.

Figure 3:
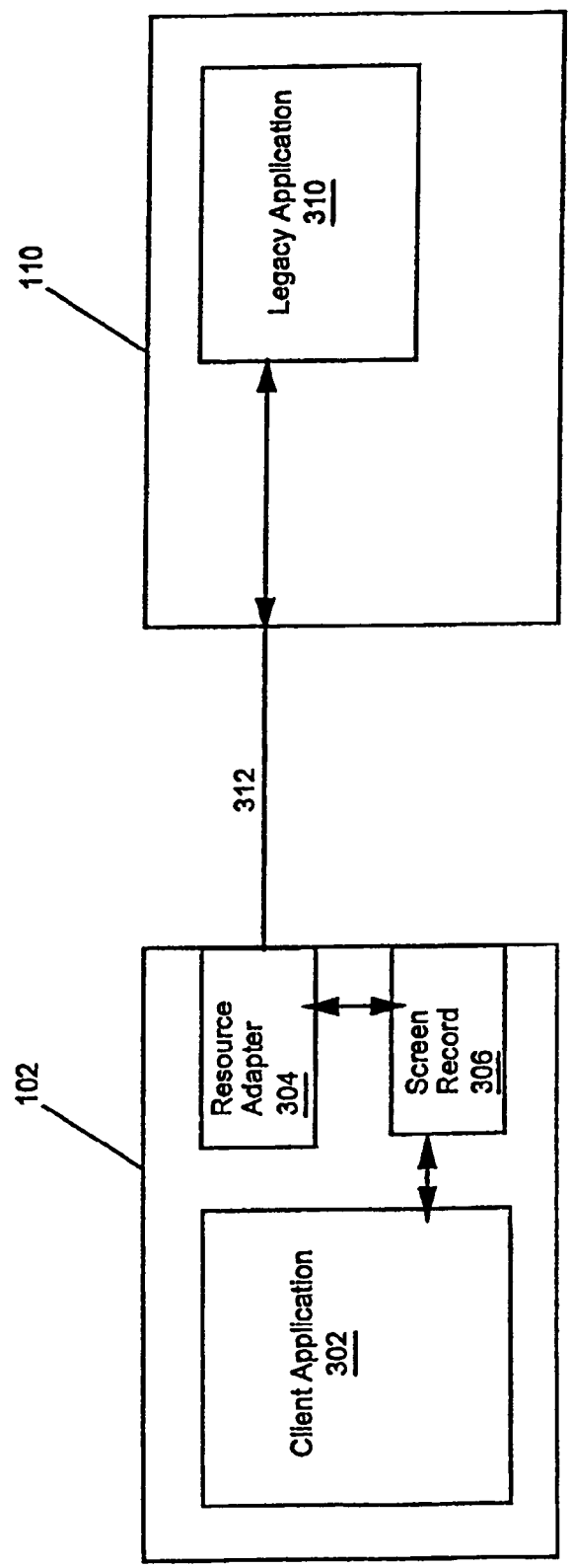
FIG. 3 illustrates, in functional block form, a portion of FIG. 1.

The computer instructions/applications stored in memory 204 and executed by CPU 202 (thus adapting the operation of computer system 100 as described herein) are illustrated in functional block form in FIG. 3. As will be appreciated by those of ordinary skill in the art, the delineation between aspects of the applications illustrated as functional blocks in FIG. 3 is somewhat arbitrary as the various operations attributed to a particular application as described herein may, in alternative embodiments, be subsumed by another application.

Included in memory 202 client 102 and host 110 but not illustrated are operating system (OS) and a communications suite.

The OS is suitable for operation with a selected CPU 202 and the operations described herein. Multitasking, multi-threaded OSes such as, for example, IBM AIX™, Microsoft Windows NT™, Linux or the like, are expected in many embodiments to be preferred.

A communication suite provides, through, interaction with OS and network I/F 208 (FIG. 2), suitable communication protocols to enable communication with other networked computing devices via network 108 (FIG. 1). The communications suite may include one or more of such protocols such as TCP/IP, ethernet, token ring and the like.

In the exemplary embodiment illustrated in FIG. 3, a client 102 communicates with host 110 via network connection 108. Client 102, a computing device, hosts an client application 302, a client side resource adapter 304 and screen record 306. Host system 110 hosts a legacy application 310 which communicates with client 102 via network 108.

Legacy application 310 does not require any modification nor adaptation to communicate with application 302 on client 102. Rather, the resource adapter 304, provides the necessary communications support to enable communication between legacy application 306 and client application 302. The screen record 306 provides a common way for an application to work with a screen, with rich function.

In the exemplary embodiment, resource adapter 304 is embodied in an Java™ 2, Enterprise Edition (J2EE) connector which communicates and uses the screenable interface and implementing classes 306. A J2EE connector provides a programming interface (API) that acts an interface between a Java program (such as client application 302) and a legacy application such as legacy application 310. Thus, access to the legacy application can easily be provided within an Enterprise JavaBean (EJB). Although resource adapter 304 is, in the exemplary embodiment, a J2EE connector, alternative resource adapters (e.g., connectors conforming to the Common Connector Framework from IBM Corp. or others) could equally be employed.

As suggested above, client application 302 is, in the exemplary embodiment, an application written in Java. However, other programming languages could equally be employed in alternative embodiments.

With the screen record 306 a resource adapter 304 can translate the data stream received from legacy application 310 (via network 312) hosted by host system 110 into a format that can be used and understood by client application 302. Similarly, data generated by client application 302 can be passed to the resource adapter through the screen record 306. Resource adapter 304 is then able to process the data received from the screen record 306 and forward it to legacy application 310 on host 110.

Figure 4:
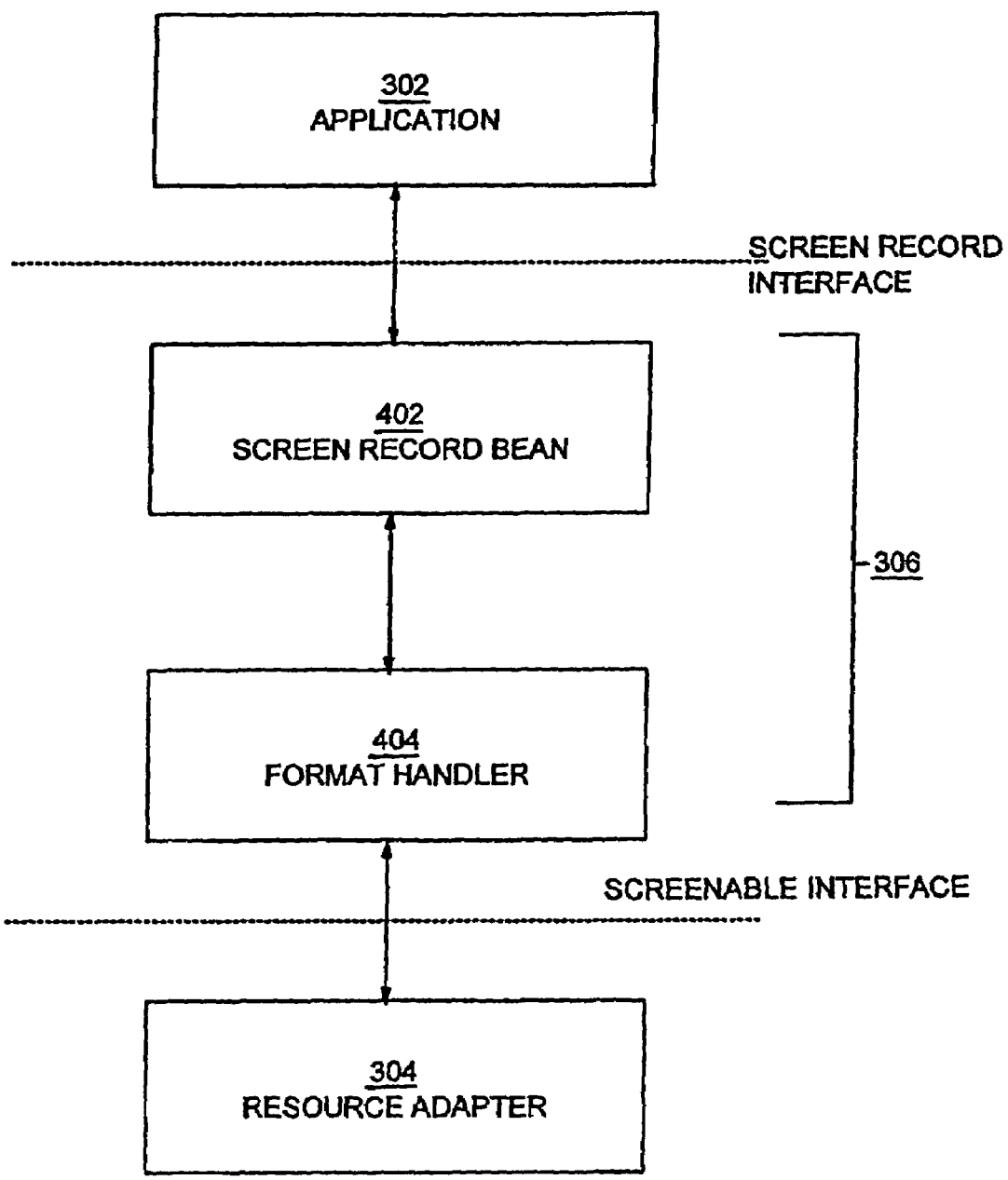
FIG. 4 illustrates, in greater detail and in functional block form, portions of FIG. 3

As illustrated in FIG. 4, screen record 306 provides two interfaces: a screen record interface (for communication between screen record 306 and client application 302); and a screenable interface (for communication between resource adapter 304 and screen record 306). Additionally, FIG. 4 illustrates, in block functional form, the functions of screen record 306. As illustrated, the exemplary embodiment provides functions which are broadly separated into a format handler 404 and a screen record handler 402.

Format handler 404 provides format and translation services for screen record 306. That is, data received from resource adapter 304 is processed by format handler 404. Similarly, data destined for resource adapter 304 is first processed by format handler 404 before the data is transmitted to its destination—client application 302 or resource adapter 304, respectively.

The following table lists the interfaces with a short description.

| Interface | Description |
| --- | --- |
| IScreenable | Interface used by resource adapter 304 to supply and retrieve data from screen record 306 |
| IScreenInfo | Used by an application to query screen attributes. |
| IFieldData | Used by the resource adapter 304 to build a field. |
| IFieldAttrInfo | Used by an application to query the attributes and extended attributes of a field. |
| ITextAttrInfo | Used by an application to query the attributes of the text in a field. |
| IExtendedAttributes | Defines constants for the extended attributes. |
| IFieldInfo | Used by an application for retrieving field data such as name, text, or position. |

(*) In an alternative embodiment, screen record 306 may also provide implementations of these interfaces. This alternative embodiment may be preferred in the instance where the screen record 306 employs pre-built fields and populates the fields with various bits of information. Alternatively, screen record 306 may provide the information via a different mechanism for the creation of the field.

IScreenable Interface

The IScreenable interface is implemented by screen record 306 and can be detected, and is used, by resource adapter 304. The IScreenable interface provides resource adapter 304 with the ability to pass information to application 302. In the pseudo-code below, the exemplary embodiment of the IScreenable interface includes several methods (described in greater detail below).

Generally, the IScreenable interface implemented by screen record 306 enables a resource adapter to create a screen record (an object of class ScreenRecord in the exemplary embodiment but, generically, could be embodied within any type of data structure—not necessarily an object in an object oriented environment) which accurately describes the fields, the field attributes and the remaining non-field portions of a screen and the fields and data contained therein (e.g., informational text; screen color; text type, color, size; etc.). Each screen record will be associated with a unique identifier (ID) so that the screen to which a screen record is associated can be properly identified. Through the methods (or, when not implementing the interface using Java, functions) provided by the IScreenable interface, the screen identifier can be set or retrieved.

Additionally, the IScreenable interface provides methods which, when invoked, enable a resource adapter 304 to retrieve data from the fields defining the screen image. In the exemplary embodiment, the data about the fields can be retrieved for all the fields or for only the modified fields. Furthermore, the methods provided by the IScreenable interface in exemplary embodiment enable a resource adapter 304 to step through (i.e., move iteratively through) either all the fields or only the modified fields contained within a screen image.

As indicated above, resource adapter 304 the exemplary embodiment conforms to the J2EE Connector architecture. Consequently, the pseudo-code below, which forms part of the screen record handler 402 of screen record 306 is implemented in the Java language. Alternative languages in alternative embodiments of the invention could equally be employed.

```
/**
 * Screen interface used by a resource adapter.
 */
public interface IScreenable {
    /**
     * Indicates the start of the field build process, providing information
     * about the Screen itself. The fullRefresh boolean indicates that the
     * resource adapter will provide all the information about the screen so
     * a record should clear out appropriate information as it will be fully
     * refreshed
     */
    void beginBuild(IScreenInfo ScrInf, boolean fullRefresh);
    /**
     * Adds a field to the screen record.
     */
    void buildField(IFieldData fieldData, IFieldAttrInfo
fieldAttrs, ITextAttrInfo textAttrs) throws ScreenException;
    /**
     * Indicates the end of the field build process.
     */
    void endBuild( );
    /**
     * Returns the screen record ID.
     */
    String getScreenId( );
    /**
     * Set the screen ID.
     */
    public void setScreenId(String ScreenId);
    /**
     * Returns an iterator for the fields contained in the screen record.
     */
    java.util.Iterator getFields( );
    /**
     * Returns an iterator for the modified fields in the screen record.
     */
    java.util.Iterator getModifiedFields( );
}
```

As indicated by the pseudo-code above, the IScreenable interface includes several methods: beginBuild; buildField; endBuild, setScreenId; getFields; and getModifiedFields. These methods are described individually below. Additionally, those methods provided by the IScreenable interface are invoked using objects defined by the IScreenInfo, IFieldData, IFieldAttrInfo, ITextAttrInfo classes. These classes are also described in greater detail below.

beginBuild

This method indicates to screen record 306 that the passing of field information is about to begin. Resource adapter 304 passes to screen record 306 an IScreenInfo object which provides information about the screen as a whole (which is described in greater detail below in the ScreenInfo Interface section). The beginBuild method has a•flag (boolean fullRefresh) which indicates to the screen record 306 whether resource adapter 304 is going to provide a full refresh of the screen or only a subset of fields which have been changed. The setting of this flag, and which information to provide to screen record 306 (the entire screen or a subset thereof), is determined by resource adapter 304. Such a determination will be made based on whether the screen record (the unit of data that is passed between resource adapter 304 and screen record 306—in the exemplary embodiment the screen record is an object of type ScreenRecord—see Appendix B for pseudo-code implementing the ScreenRecord object class) has been defined to contain all of the data fields defined by the screen (thus enabling support of the transfer of a subset of the record data). If the record has been created which contains all of the data fields present in the screen image, then the record has been sufficiently defined to support an update only. A resource adapter only calls buildField for fields which already exist in the record—new fields are not added. That is, when there is no existing ScreenRecord then a resource adapter can create a ScreenRecord, and build (add) all the fields necessary. If a FullRefresh is not selected, then a ScreenRecord must already be populated. Only the fields that exist can be changed, and new ones should not be added by the Resource Adapter. In the case where a tool has pre-built the ScreenRecord and customized it with accessors and meaningful names, then the resource adapter should not overwrite those fields. This can be done by the generated ScreenRecord overriding the behaviour of the beginBuild and buildField methods.

buildField

The buildField method is used to create a field or populate an existing field in a screen record. When a field is created it is assigned an index number. The index number in the exemplary embodiment starts at 1 and is incremented for each invocation of buildField. Resource adapter 304, in the exemplary embodiment, delivers fields in a screen image in sequential order: from left to right, and top to bottom. (Other orders or forms could alternatively be employed.) As indicated in the pseudo-code above, buildField can throw a ScreenException and may be passed up to three parameters: IFieldData; IFieldAttrInfo; and ITextAttrInfo. Each of these three possible parameters are described below. Additionally, pseudo-code is provided in Appendix A for the classes which are instantiated for each of these three possible parameters.

endBuild

This method indicates that the build process has ended. It indicates that no more fields are to be created or populated. No parameters are passed to the endBuild method.

getScreenId and setScreenId

The setScreenId and getScreenId methods provide the ability to access (i.e., write or read, respectively) with a unique identifier or retrieve that unique identifier, respectively. The ScreenId tagging allows a resource adapter 304 to tag a ScreenRecord supplied to receive output. If that ScreenRecord is then used for input, the resource adapter 304 can look at the tag (ScreenId) to determine if it was the last one used for output. If so, then as a performance optimization, a resource adapter 304 can skip validation of the input record that would otherwise confirm that the input record matched the data presented by a screen.

getFields

This method, which enables access (in this case, the ability to read) to the fields stored within the screen record, returns an iterator of all the fields within the record. The getFields method relies on the screen record (which in the exemplary embodiment is implemented by instances of the ScreenRecord class which in turn relies on the FieldInfo interface.

getModifiedFields

This method, when invoked, also enables access to the fields stored within the screen record, returns an iterator of all fields that have been flagged as modified by the screen record handler 402. A field is flagged as modified when the value of the modified attribute is true. This will occur when the FieldRecord.setText(String) method is invoked.

As noted above, the IScreenable interface, and more particularly the beginBuild method, uses three parameters conforming to the classes: IFieldData; IFieldAttrInfo; and ITextAttrInfo. These three classes are described below.

IFieldData

In the exemplary embodiment, an object instantiated from the IFieldData class is required. The IFieldData class provides the basic information about a field and its contents. Pseudo-code describing an implementation of this class is found in Appendix A. For example, in the exemplary implementation, the IFieldData class provides a method, getPos, which returns an absolute position so that the row and column location of a field in the screen image can be calculated.

IFieldAttrInfo

This class (which in the exemplary implementation is optional) provides information about attributes for a particular field. For example, the pseudo-code found in Appendix A describing one exemplary implementation of this class provides information such as background color, foreground color, character set, highlight attributes and the like.

If a null value is passed to the buildField method (described above), the screen record 306 assumes that the field has no attributes. As a consequence, the screen record 306 may provide default values as required if field attribute properties are to be exposed.

ITextAttrInfo

In the exemplary embodiment, use of this class is optional. The ITextAttrInfo class provides information about attributes for individual characters of text. The pseudo-code for an exemplary ITextAttrInfo class found in Appendix A illustrates that the exemplary embodiment provides information on text colors and other extended attributes. As will be appreciated other text attributes (e.g., font size, font characteristics—italics, bolding, underlining, etc.) could be provided in alternative embodiments.

If a null is passed to the buildField method of the IScreenable interface, the screen record 306 assumes that no individual attributes are available. Consequently, screen record 306 provides any default values that may be required if the text attribute properties are to be exposed.

IScreenInfo Interface

This interface represents information about the screen image. The ScreenInfo interface is implemented by resource adapter 304 to pass information to the screen record 306. Pseudo-code implementing an exemplary embodiment of the ScreenInfo interface is included in Appendix A.

In the exemplary embodiment, general data about the screen image is described by the ScreenInfo interface. This general data include general visual characteristics such as, for example, default colors and character set and the like. Additionally, the ScreenInfo interface provides data describing the number of rows (returned by invoking the getDepth method), the number of columns (returned by invoking the getWidth method) and the number of fields in the screen image (returned by invoking the getFieldCount).

As will be appreciated by those of ordinary skill in the art, the ScreenInfo interface (amongst other aspects of the present invention) enables applications to be developed without a detailed knowledge of the screen image that is provided by legacy application 310 (FIG. 3). Using the ScreenInfo interface significant or important details about the screen image can be determined by a client application 302 during execution. For example, a client application 302 can, during execution, use the ScreenInfo interface to determine the size of a screen image (row×columns) and the number of fields contained therein. When coupled with the getFields method described above, additional detail about each field can be ascertained. These features provide a very powerful combination that produces numerous benefits to an application developer.

IFieldInfo

As indicated above, the FieldInfo interface is relied upon by the getFields method which forms part of the IScreenable interface described above. The FieldInfo interface represents the information that a resource adapter 304 may use to determine which field to update in its internal representation of the screen image. Objects returned by the getFields or getModifiedFields methods defined in the IScreenable interface, implemented by records implement this interface.

A pseudo-code exemplary of an implementation of the IFieldInfo interface is found in Appendix A. In the exemplary implementation, the IFieldInfo provides methods which, when invoked, provided data describing the name of a field, the starting row and column of field, and the text contained within that field (e.g., the address of a person for Field named "ADDRESS").

IExtendedAttributes

The IExtendedAttributes interface contains a collection of constants that define extended attribute values such as color, highlight and transparency. A field record can implement this interface to add the constants to its interfaces or classes.

IFieldRecord

The FieldRecord Interface contains methods used to access fields and screen characteristics and is implemented by a similarly named class. The FieldRecord class, shown in pseudo-code in Appendix C.

ScreenRecord

This class implements the ExtendedAttributes, Screenable and ScreenRecord interfaces. The screen record (implemented by the objects instantiated from the ScreenRecord class—shown in pseudo-code in Appendix B) provides the basic record that is passed between client application 302 and format handler 306 (FIGS. 3 and 4).

In addition to the resource adapter interfaces, there are some interfaces implemented in the exemplary embodiment that enable tooling to be developed. The following table lists the interfaces used by tooling and a short description.

| Interface | Information |
|---|---|
| IFieldRecord | Used by application programmer to access a field's text, attributes, and extended attributes. |
| IScreenRecord | Used by application programmer to access fields and screen characteristics. |

| Class | Information |
|---|---|
| FieldRecord | A resource adapter can use this to add a field to a ScreenRecord. It can be used in generic Screen programming by an application programmer. |
| ScreenRecord | A resource adapter can use this to work with a Screen. It can be used in generic Screen programming by an application programmer. |

IScreenRecord Interface

The IScreenRecord interface contains methods used to access fields and screen characteristics and is shown below.

```
public interface IScreenRecord {
  IFieldRecord getField(int index) throws ScreenException;
  IFieldRecord getField(String name) throws ScreenException;
  int getFieldCount( );
  java.util.Iterator getFields( );
  int getScreenDepth( );
  int getScreenWidth( );
}
```

As a result of the screen record and its related interfaces described above, a client application 302 can be developed without any prior knowledge of the screen image that is generated and transmitted by legacy application 310. This development without prior knowledge is enabled by the screen record 306 which enables an application to query a screen record for the fields (and related attributes) contained within a screen image. Advantageously, a client application can determine which of those fields have been modified thus improving the responsiveness of a client application 302.

In operation, conventional data from legacy application 310 (FIG. 3) describing a screen image will be transmitted over a network by a resource adapter 304. Using the interfaces described above and, in particular, the screenable interface, resource adapter 304 will cause a screen record 306 (in the exemplary embodiment, an instance of the ScreenRecord class) to be created (assuming such a screen record has not yet been created). The data structures of screen record 306 is then populated with data received by resource adapter 304 from legacy application 310. In the instance where the screen record was previously created by resource adapter 304 (by instantiating an object of class ScreenRecord in the exemplary embodiment), a new screen record 306 would not be created. Rather, the various data structures (e.g., fields, field or text attributes, etc.) in the existing screen record 306 are modified as necessary. However, where a tool has pre-built a screen record 306 and customized it with accessors and meaningful names, then resource adapter 304 would not overwrite those fields.

Client application 302 is then passed or accesses the created and populated screen record 306 to access or modify the data therein as required. The modified screen record 306 is then passed back to resource adapter 304. Resource adapter 304 then accesses the data necessary to generate a data stream (to be transmitted over network 312) from the data contained in screen record 306. This generated data stream, which is in a format understandable by legacy application 310, is then transmitted over network 312 to legacy application 310.

As will be appreciated by those skilled in the art, modifications to the above-described embodiment can be made without departing from the essence of the invention. For example, in place of many variables each individually associated with one of the many text attributes, a bit field could be used in alternative embodiments where each bit would represent a particular attribute. For example, a first bit, when "on" (i.e., set to "1") could indicate that the field is highlighted. Setting or changing to this bit to "off" (i.e., set to "0") would indicate the same field is not highlighted.

In a further alternative, the procedure for accessing the fields in the IScreenable interface could be modified. In the exemplary embodiment, the getFields method enables iteration through the various fields. Other procedures could be alternatively employed. For example, the fields could be accessed by an index. Alternatively, the fields could be accessed by the name of the field. In a further alternative, getFields would enable a field to be accessed by reference to a particular object (each field being represented by an object). In a still further alternative, the fields could be accessed by enumeration. Other possible access procedures could equally or alternatively be employed.

In a further alternative, a single interface between resource adapter 304 and client application 302 (the single interface defined by an embodiment of the present invention) could be employed as a replacement to the IScreenable interface and the screen record interface. In this embodiment, the interface would provide a signal to the client application that field information (describing the screen and any related data) is about to commence. Thereafter, data describing the various fields in the screen would be delivered. When data is delivered to the single interface, the resource adapter would be able to query all or some of the fields received and, additionally, ascertain whether any processing is required for a particular field (e.g., processing may be required if a field has been modified).

As will be appreciated by those of ordinary skill in the art, the various classes and interfaces described in the exemplary embodiment of the present invention may be modified while falling within the scope of the claimed invention. For example, it may be desirable to merge certain interfaces/classes together or, alternatively, break up the different methods and variables of one or more interfaces/classes into more than one interface/class having a scope of operation which differs from those described above. For example, it is contemplated that, in an alternative embodiment, the IFieldAttrInfo and IExtendedAttributes interfaces could be merged. Similarly, the IFieldInfo and the IFieldData interfaces could also be merged in the same or a different embodiment. Other interfaces, in alternative embodiments, could be similarly merged or, alternatively, split apart into more than one interface.

While one (or more) embodiment(s) of this invention has been illustrated in the accompanying drawings and described above, it will be evident to those skilled in the art that changes and modifications may be made therein without departing from the essence of this invention. All such modifications or variations are believed to be within the sphere and scope of the invention as defined by the claims appended hereto. Other modifications will be apparent to those skilled in the art and, therefore, the invention is defined in the claims.

The invention claimed is:

1. A method for providing data describing a screen image to a first application between a client executing the first application and a host system executing a second application and connected to the client via a network, the client having a resource adaptor and a screen record which provides the screen image to the first application, the resource adaptor passing a IScreenInfo object to the screen record, the IScreenInfo object providing information on the whole screen, the client translating the data which the resource adaptor received from the second application hosted by the host system via the network into a format which can be used by the first application, the method further comprising:

in the client, populating the screen record in an objected oriented environment with the data received from the second application and describing a field in order to translate the data into the format, the population being performed by using an interface which is implemented by the screen record and is used by the resource adaptor, the screen record in the objected oriented environment having a code to access the data describing the field, wherein a getFields method enables the access to the data and returns iterator of all the fields within a record.

2. The method as claimed in claim 1, wherein the resource adapter comprises a Java 2 Enterprise Edition connector.

* * * * *